US006458459B1

(12) United States Patent
Schwalm et al.

(10) Patent No.: US 6,458,459 B1
(45) Date of Patent: Oct. 1, 2002

(54) RADIATION-CURABLE FORMULATIONS BASED ON ALIPHATIC, URETHANE-FUNCTIONAL PREPOLYMERS HAVING ETHYLENICALLY UNSATURATED DOUBLE BONDS

(75) Inventors: Reinhold Schwalm, Wachenheim (DE); Frank Völlinger, Edenkoben (DE); Erich Beck, Ladenburg (DE); Klaus Menzel, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/149,662

(22) Filed: Sep. 9, 1998

(30) Foreign Application Priority Data

Sep. 11, 1997 (DE) .......................... 197 39 970

(51) Int. Cl.⁷ ............................ B32B 27/00; C08F 2/46; C08J 7/18; C08J 3/28
(52) U.S. Cl. ................................ 428/423.1; 428/411.1; 428/425.8; 428/458; 427/487; 427/496; 427/500; 427/508; 427/514; 522/90; 522/96
(58) Field of Search ................... 522/90, 96; 428/411.1, 428/423.1, 458, 425.8; 427/487, 496, 508, 500, 514

(56) References Cited

U.S. PATENT DOCUMENTS

| 3,919,347 | A | * | 11/1975 | Kafsimbas | ................. 525/167 |
|---|---|---|---|---|---|
| 4,072,770 | A | | 2/1978 | Ting | |
| 4,205,018 | A | * | 5/1980 | Nagasawa et al. | ........... 525/404 |
| 4,430,474 | A | * | 2/1984 | Schnurbusch et al. | ...... 524/590 |
| 4,902,727 | A | * | 2/1990 | Aoki et al. | ................... 522/90 |
| 5,149,592 | A | | 9/1992 | Wojnarowicz | |
| 5,212,210 | A | * | 5/1993 | Halm | ........................... 522/24 |
| 5,475,038 | A | | 12/1995 | Skoultchi | |

FOREIGN PATENT DOCUMENTS

| EP | 0 457 499 | 11/1991 |
|---|---|---|
| EP | 0 658 582 | 6/1995 |

OTHER PUBLICATIONS

Derwent Abstracts, AN 93–216860, JP 05 140254, Jun. 8, 1993.

* cited by examiner

*Primary Examiner*—Paul Thibodeau
*Assistant Examiner*—Monique R. Jackson
(74) *Attorney, Agent, or Firm*—Oblon, Spivak, McClelland, Maier & Neustadt, P.C.

(57) ABSTRACT

Radiation-curable formulations comprising i) at least one aliphatic, urethane-functional prepolymer which on average has at least two ethylenically unsaturated double bonds, ii) at least one monofunctional ester of an $\alpha,\beta$-ethylenically unsaturated carboxylic acid with a monofunctional alkanol which has a saturated, carbocyclic or heterocyclic structural element, and iii) if desired, a di- or polyfunctional ester of an $\alpha,\beta$-ethylenically unsaturated carboxylic acid with an aliphatic di- or polyol are used to coat substrates.

44 Claims, No Drawings

RADIATION-CURABLE FORMULATIONS BASED ON ALIPHATIC, URETHANE-FUNCTIONAL PREPOLYMERS HAVING ETHYLENICALLY UNSATURATED DOUBLE BONDS

BACKGROUND OF THE INVENTION

1. Field of the Invention

The present invention relates to radiation-curable formulations which comprise at least one aliphatic, urethane-functional prepolymer having at least two ethylenically unsaturated double bonds and at least one monofunctional ester of an α,β-ethylenically unsaturated carboxylic acid with a monofunctional alkanol, said prepolymer having as a structural element at least one saturated 5- or 6-membered carbocycle or one or 6-membered heterocycle with one or two oxygens in the ring.

Radiation-curable compositions have acquired widespread importance in the art, especially as high-grade surface coating materials. By radiation-curable compositions are meant formulations which include ethylenically unsaturated polymers or prepolymers and which, directly or after a physical drying step, are cured by the action of high-energy radiation, for example by irradiation with UV light or by irradiation with high-energy electrons (electron beams).

2. Description of the Related Art

Particularly high-grade coatings are obtained if the radiation-curable composition employed comprises formulations that contain an ethylenically unsaturated, urethane-functional polymer or prepolymer. Ethylenically unsaturated urethane-functional polymers and prepolymers are known, for example, from P. K. T. Oldring (ed.), Chemistry and Technology of UV- and EB-Formulations for Coatings, Inks and Paints, Vol. II, SITA Technology, London 1991, pp. 73–123. Because of the high viscosity of ethylenically unsaturated, urethane-functional polymers and prepolymers, such compositions are often admixed with ethylenically unsaturated compounds of low molecular mass in order to reduce the viscosity. These compounds, like the ethylenically unsaturated polymers and prepolymers, are polymerized in the course of curing and so incorporated into the coating. They are therefore referred to as reactive diluents. Hence the properties of the resulting coatings are determined both by the ethylenically unsaturated polymer or prepolymer employed and by the reactive diluent. For optimum coating properties, furthermore, it is necessary to harmonize the ethylenically unsaturated polymers or prepolymers with the reactive diluents.

DE-A-27 260 41 discloses radiation-curable compositions comprising at least one polyetherurethane which is modified at the ends with acrylate and/or methacrylate groups, a low molecular mass polyfunctional acrylate with ether groups, and hydroxyalkyl acrylates. Radiation-curable compositions of this kind lead to coatings having increased flexibility.

EP-A-508 409 discloses radiation-curable compositions which comprise at least one ethylenically unsaturated polyesterurethane and at least one nonaromatic, low molecular mass substance having at least one, preferably at least two, (meth)acryloyl groups, as crosslinker (=reactive diluent). Radiation-curable compositions of this kind lead to coatings having improved weathering stability.

A fundamental problem with the radiation-curable compositions of the prior art is that, although it is possible by selecting and harmonizing the components (prepolymer and reactive diluent) to improve individual in-use properties such as coating hardness, flexibility and weathering resistance, this is always at the expense of other properties.

BRIEF SUMMARY OF THE INVENTION

It is an object of the present invention to provide radiation-curable compositions which lead to coatings having balanced profiles of properties, with great hardness, high flexibility and high weathering resistance, and which at the same time feature low application viscosity and a high curing rate.

We have found that this object is achieved, surprisingly, by a radiation-curable composition which comprises at least one aliphatic, urethane-functional prepolymer and at least one monofunctional ester of an α,β-ethylenically unsaturated carboxylic acid with a monofunctional alkanol which has as a structural element at least one saturated 5- or 6-membered carbocycle or one corresponding heterocycle having one or two oxygens in the ring.

DETAILED DESCRIPTION OF THE INVENTION

The present invention consequently provides radiation-curable formulations which comprise i) at least one aliphatic, urethane-functional prepolymer which on average has at least two ethylenically unsaturated double bonds per molecule (=component A), ii) at least one monofunctional ester of an α,β-ethylenically unsaturated carboxylic acid with a monofunctional alcohol which has as a structural element at least one saturated 5- or 6-membered carbocycle or one saturated 5- or 6-membered heterocycle with one or two oxygens in the ring (=component B), and iii) if desired, di- or polyfunctional esters of an α,β-ethylenically unsaturated carboxylic acid with an aliphatic di- or polyol (=component C).

In accordance with the invention, the aliphatic, urethane-functional prepolymer is free from aromatic structural elements such as phenylene or naphthylene or substituted derivatives thereof. Component B contains no nitrogens.

In general, the compositions of the invention contain from 20 to 90% by weight, preferably from 30 to 80% by weight, and in particular from 40 to 70% by weight, of component A, from 10 to 80% by weight, preferably from 20 to 60% by weight, and in particular from 30 to 50% by weight, of component B, from 0 to 40% by weight and, preferably, from 0 to 30% by weight, of component C and up to 20% by weight, based on the overall weight of components A, B and C, of customary auxiliaries, with the proviso that the amounts by weight of components A, B and C add up to 100% by weight. In general, the weight of components B and C is in the range from 10 to 80% by weight, preferably from 20 to 70% by weight and, in particular, from 30 to 60% by weight, based in each case on the overall weight A+B+C.

Depending on the desired profile of properties the compositions of the invention comprise component B and component C or exclusively component B. Where high coating hardness is desired the formulation of the invention preferably comprises component B and component C. If instead greater value is placed on high flexibility, component C may be omitted. In addition, as the amount of component C increases, the viscosity of the formulations of the invention is improved. In the first case the ratio of component B to component C is preferably in the range from 20:1 to 1:1 and, in particular, in the range 10:1 to 1.5:1.

In general, component A is composed essentially of one or more aliphatic structural elements, urethane groups and at least two ethylenically unsaturated structural units. Aliphatic structural elements include both alkylene groups, preferably with 4 to 10 carbons, and cycloalkylene groups, preferably with 6 to 20 carbons. Both the alkylene and cycloalkylene groups can be substituted one or more times by $C_1$–$C_4$-alkyl, especially by methyl, and may include one or more nonadjacent oxygens. The aliphatic structural elements may be connected to one another by way of quaternary or tertiary carbons, by way of urea groups, biuret, uretdione, allophanate, cyanurate, urethane, ester or amide groups or by way of ether oxygen or amine nitrogen. Component A is preferably free from uretdione or allophanate groups and from amine nitrogen. Furthermore, component A in accordance with the invention has at least two ethylenically unsaturated structural elements. These are preferably vinyl or allyl groups, which can also be substituted by $C_1$–$C_4$-alkyl, especially methyl, and which are derived in particular from $\alpha,\beta$-ethylenically unsaturated carboxylic acids and/or their amides. Particularly preferred ethylenically unsaturated structural units are acryloyl and methacryloyl groups, such as acrylamido and methacrylamido and, in particular, acryloxy and methacryloxy. With particular preference, component A has at least three ethylenically unsaturated structural elements per molecule.

Very particular preference is given to components A in which the aliphatic structural elements are linked by way of cyanurate, biuret and/or urethane groups and whose ethylenically unsaturated structural elements are acryloxy groups.

The number-average molecular weight $M_n$ of the urethane-finctional prepolymers of component A is preferably $\leq 2000$ and is in particular in the range from 400 to 1500. The double bond density in such prepolymers is preferably above 1.5 mol/kg of prepolymer and, in particular, is in the range from 2 to 6 mol/kg of prepolymer.

Ethylenically unsaturated, urethane-functional prepolymers of this kind are fundamentally known to the skilled worker. Preferred aliphatic urethanes that are free of urea groups are obtainable, for example, by reacting i) at least one aliphatic compound or one aliphatic prepolymer having at least two and preferably three or 4 isocyanate groups (component a1) with ii) at least one compound which has at least one reactive OH group and at least one ethylenically unsaturated double bond (component a2) and, if desired, iii) one or more aliphatic compounds having at least one reactive OH group (component a3).

In this case the ratio of the OH groups of components a2 and a3 to the NCO groups of component a1, OH/NCO, is $\geq 1$, so that the resulting prepolymer contains no NCO groups. Component a2 is preferably employed in an amount such that the OH groups it contains ($OH_{a2}$) are in a ratio to the NCO groups of component a1, $OH_{a2}$/NCO, which is in the range from 0.4 to 0.95 and, preferably, from 0.6 to 0.9.

Compounds suitable as component a1 are aliphatic diisocyanates, oligomeric adducts of aliphatic diisocyanates with polyfunctional alcohols having preferably 2 to 20 carbons, and the uretdiones, isocyanurates, biurets and allophanates of aliphatic diisocyanates. Examples of suitable aliphatic diisocyanates are tetramethylene diisocyanate, hexamethylene diisocyanate, octamethylene diisocyanate, decamethylene diisocyanate, dodecamethylene diisocyanate, tetradecamethylene diisocyanate. 1,6-diisocyanato-2,2,4-trimethylhexane, 1,6-diisocyanato-2,2,4,4-tetramethylhexane, 1,2-, 1,3- or 1,4-diisocyanatocyclohexane, 4,41-di(isocyanatocyclohexyl)methane, 1-isocyanato-3,3,5-trimethyl-5(isocyanatomethyl)cyclohexane (=isophorone diisocyanate) and 2,4- or 2,6-diisocyanato-1-methylcyclohexane. Suitable polyfunctional alcohols include aliphatic di- or polyols having preferably 2 to 20 carbons, such as ethylene glycol, diethylene glycol, triethylene glycol, 1,2-propylene glycol, 1,3-propylene glycol, dipropylene glycol, tripropylene glycol, 1,4-butanediol, 1,5-pentanediol, neopentyl glycol, 1,6-hexanediol, 2-methyl-1,5-pentanediol, 2-ethyl-1,4-butanediol, dimethylolcyclohexane, glycerol, trimethylolethane, trimethylolpropane, trimethylolbutane, pentaerythritol, ditrimethylolpropane, erythritol and sorbitol. Component a1 is preferably selected from the trimerization products of the abovementioned aliphatic diisocyanates, in other words the biurets and the isocyanurates, and the adducts of the above-mentioned aliphatic diisocyanates with one of the abovementioned polyfunctional aliphatic alcohols having at least three reactive OH groups. It is particularly preferred to employ as component a1 the isocyanurate and/or the biuret of hexamethylene diisocyanate and, with very particular preference, its isocyanurate.

Examples of suitable components a2 are the esters of ethylenically unsaturated carboxylic acids with one of the abovementioned aliphatic polyols and also the vinyl, allyl and methallyl ethers of these polyols, provided they also have one isocyanate-reactive OH group. It is also possible to employ the amides of ethylenically unsaturated carboxylic acids with amino alcohols. Preference as component a2 is given to the esters of acrylic and methacrylic acid, such as 2-hydroxyethyl (meth)acrylate, hydroxypropyl (meth)acrylate, 1,4-butanediol mono(meth)acrylate, neopentyl glycol mono(meth)acrylate, trimethylolpropane di(meth)acrylate, pentaerythritol di- and -tri(meth)acrylate. with particular preference component a2 is selected from hydroxypropyl acrylate and butanediol monoacrylate, and in particular a2 is 2-hydroxyethyl acrylate.

Examples of suitable aliphatic compounds having at least one reactive OH group (component a3) are alkanols having preferably 1 to 10 carbons, cycloalkanols having preferably 5 to 10 carbons, and monoalkyl ethers of polyalkylene glycols. Examples of suitable alkanols are methanol, ethanol, —and isopropanol, n-, 2-, iso- and tert-butanol, amyl alcohol, isoamyl alcohol, n-hexanol, n-octanol, 2-ethylhexanol and decanol. Suitable cycloalkanols include, for example, cyclopentanol and cyclohexanol, which are unsubstituted or substituted one or more times by $C_1$–$C_4$-alkyl, for example methyl, ethyl, n-propyl, isopropyl, n-butyl, 2-butyl, isobutyl or tert-butyl, especially by methyl. Examples of monoalkyl ethers of polyalkylene glycols are the mono-$C_1$–$C_4$-alkyl ethers and, in particular, the methyl ethers of ethylene glycol, diethylene glycol or triethylene glycol.

Component A is prepared in a known manner by reacting component a1 with components a2 and, if used, a3 at from 0 to 100° C. and, in particular, at from 20 to 70° C. It preferred to react component a1 and a2 first of all. Component a3 is added subsequently under reaction conditions.

To accelerate the reaction it is possible to employ catalysts as are described, for example, in Houben-Weyl, Methoden der Organischen Chemie, Vol. XIV/2, Thieme-Verlag, Stuttgart 1963, p. 60f. and Ullmanns Enzyklopädie der Technischen Chemie, 4th ed., Vol. 19 (1981), p. 306. Tin-containing catalysts are preferred, such as dibutyltin dilaurate, tin(II) octoate or dibutyltin dimethoxide. Such catalysts are generally employed in an amount of from 0.001 to 2.5% by weight, preferably from 0.005 to 1.5% by weight, based on the overall amount of the reactants.

To stabilize the free-radically polymerizable compounds (component a2) it is preferred to add to the reaction from 0.001 to 2% by weight, in particular from 0.005 to 1.0% by weight, of polymerization inhibitors. These are the usual compounds suitable for hindering free-radical polymerization, examples being hydroquinones or hydroquinone monoalkyl ethers, 2,6-di-tert-butylphenols, such as 2,6-di-tert-butylcresole, nitrosamines, phenothiazines or phosphorous esters. The reaction can be carried out either without solvent or with the addition of solvents. Suitable solvents are inert solvents such as acetone, methyl ethyl ketone, tetrahydrofuran, dichloromethane, toluene, $C_1$–$C_4$-alkyl esters of acetic acid, such as ethyl acetate or butyl acetate. The reaction is preferably carried out without solvent.

As component B it is possible in principle to employ all monofunctional esters of α,β-ethylenically unsaturated carboxylic acids with a monofunctional alcohol which has a structural element at least one saturated 5- or 6-membered heterocycle with one or two oxygens in the ring. Component B is preferably derived from acrylic or methacrylic acid. Examples of suitable compounds of component B embrace compounds of the formula I:

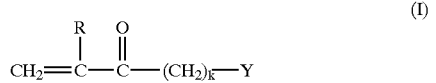

(I)

where

R is H or $CH_3$, especially H, k is from 0 to 4, especially 0 or 1, and

Y is a 5- or 6-membered saturated carbocycle or a 5- or 6-membered saturated heterocycle with one or two oxygens, the heterocycle being unsubstituted or substituted by $C_1$–$C_4$-alkyl, such as by methyl, ethyl, n-propyl, isopropyl, n-butyl, 2-butyl, isobutyl or tert-butyl.

The 5- or 6-membered saturated heterocycle is preferably derived from tetrahydrofuran, tetrahydropyran, 1,3-dioxolane, 1,3- or 1,4-dioxane.

With particular preference, component B is selected from trimethylolpropane monoformal acrylate, glycerol monoformal acrylate, cyclohexylmethyl acrylate, 4-tetrahydropyranyl acrylate, 2-tetrahydropyranylmethyl acrylate and tetrahydrofurfuryl acrylate. Very particular preference is given to the use as component B of trimethylolpropane monoformal acrylate.

In addition, the radiation-curable formulations may comprise, in the amounts indicated above, a di- or polyfunctional ester of an α,β-ethylenically unsaturated carboxylic acid with an aliphatic di- or polyol. Suitable examples are the esterification products of the di- or polyols set out above in connection with component a1. Preference is given to the esters of acrylic and methacrylic acid, especially the diesters of diols. Preferably, the diols and/or polyols contain no heteroatoms other than in OH functions.

Examples of suitable components B include ethylene glycol di(meth)acrylate, propylene glycol di(meth)acrylate, butylene glycol di(meth)acrylate, 1,6-hexanediol di(meth)acrylate, diethylene glycol di(meth)acrylate, triethylene glycol di(meth)acrylate, dipropylene glycol di(meth)acrylate, tripropylene glycol di(meth)acrylate, 1,4-cyclohexanediol di(meth)acrylate and 1,4-bis(hydroxymethyl)cyclohexane di(meth)acrylate, and also trimethylolethane tri(meth)acrylate, trimethylolpropane tri(meth)acrylate and pentaerythritol tetra(meth)acrylate. Particularly preferred components B are butanediol diacrylate, hexanediol diacrylate, 1,4-cyclohexanediol diacrylate and 1,4-bis(hydroxymethyl)cyclohexane diacrylate. Hexanediol diacrylate is especially preferred.

The radiation-curable formulations of the invention may also include, depending on their intended use, up to 20% by weight of customary auxiliaries, such as thickeners, leveling assistants, defoamers, UV stabilizers, lubricants and fillers. Suitable auxiliaries are sufficiently well known to the skilled worker from paints and coatings technology. Suitable fillers include silicates, for example silicates obtainable by hydrolysis of silicon tetrachloride such as Aerosil® from Degussa, silica, talc, aluminum silicates, magnesium silicates, calcium carbonates, etc. Suitable stabilizers include UV absorbers, such as oxanilides, triazines and benzotriazole (the latter obtainable as Tinuvin® grades from Ciba-Spezialitatenchemie) and benzophenones. These can be used alone or together with suitable free-radical scavengers, examples being sterically hindered amines, such as 2,2,6,6-tetramethylpiperidine, 2,6-di-tertbutylpiperidine or derivatives thereof, such as bis(2,2,6,6-tetramethyl-4-piperidyl) sebacate. Stabilizers are normally employed in amounts of from 0.1 to 5.0% by weight and preferably from 0.5 to 3.5% by weight, based on the components A to C present in the formulation.

Insofar as curing takes place by means of UV radiation, the formulations of the invention comprise at least one photoinitiator which is able to initiate the polymerization of ethylenically unsaturated double bonds. Such photoinitiators include benzophenone and benzophenone derivatives such as 4-phenylbenzophenone and 4-chlorobenzophenone, Michler's ketone, anthrone, acetophenone derivatives, such as 1-benzoylcyclohexan-1-ol, 2-hydroxy-2,2-dimethylacetophenone and 2,2-dimethoxy-2-phenylacetophenone, benzoin and benzoin ethers, such as benzoin methyl, ethyl and butyl ethers, benzil ketals, such as benzil dimethyl ketal, 2-methyl-1-[4-(methylthio)phenyl]-2-morpholinopropan-1-one, anthraquinone and its derivatives, such as β-methylanthraquinone and tert-butylanthraquinone, acylphosphine oxides, such as 2,4,6-trimethylbenzoyldiphenylphosphine oxide, ethyl-2,4,6-trimethylbenzoylphenylphosphinate and bisacylphosphine oxides. These photoinitiators are, where necessary, employed in amounts of from 0.05 to 20% by weight, preferably from 0.1 to 10% by weight, and in particular from 0.1 to 5% by weight, based on the polymerizable components A, B and C of the formulations of the invention. If the formulation of the invention is cured by means of electron beams, the use of photoinitiators can be omitted. When electron beam curing is employed, the formulations of the invention may additionally contain colored pigments.

Preferably, the formulations of the invention contain no pigments or fillers. In addition, the formulations of the invention are preferably free from inert, nonpolymerizable solvents.

The formulations of the invention are prepared by blending the components in a conventional manner. Blending may take place at room temperature or at up to 100° C. and is effected, for example, by means of customary mixing equipment such as stirring vessels or static mixers.

The formulations of the invention are found to be particularly appropriate for the coating of substrates such as wood, paper, plastic surfaces, mineral construction materials, such as shaped cement blocks and cement fiber slabs, and especially for metals or coated metals.

Accordingly, the present invention also provides a method of coating substrates, especially metals or coated metals, and the coated substrates obtainable by this method. The substrate is generally coated by applying at least one radiation-curable formulation of the invention in the desired thickness to the substrate which is to be coated, removing any solvent and then curing the coating by the action of high-energy radiation such as UV radiation or electron beams. This operation may, if desired, be repeated one or more times. The radiation-curable formulations are applied to the substrate conventionally, for example by spraying, brushing, rolling or flow-coating or by coating with a filler knife or doctor blade. The coating add-on is generally in the range from 3 to 500 g/m$^2$ and preferably from 10 to 200 g/m$^2$, corresponding to wet film thicknesses of from about 3 to 500 μm, preferably from 10 to 200 μm. Application can be made either at room temperature or above, but preferably not above 100° C. The coatings are subsequently cured through the action of high-energy radiation, preferably UV radiation with a wavelength of from 250 to 400 nm, or by irradiation with high-energy electrons (electron beams; from 150 to 300 keV). Examples of UV sources used are high-pressure mercury vapor lamps, for example the CK or CK1 lamps from IST. The radiation dose which is usually sufficient for crosslinking is within the range from 80 to 3000 mJ/cm$^2$.

In one preferred procedure curing takes place continuously by passing the substrate that has been treated with the formulation of the invention at a constant speed in front of a radiation source. This requires the curing rate of the formulation of the invention to be sufficiently high.

The formulations of the invention feature low viscosity, preferably ≦10 Pas (determined at 23° C. using an ICI cone-plate viscometer) and high reactivity, represented by a value of ≧10 m/min (corresponding to he rate at which the substrate, treated with a radiation-curable formulation in a wet film thickness of 100 μm, can be passed at a distance of 10 cm in front of a UV source having an output of 120 W/cm so that full cure still takes place). It is possible at the same time to realize high hardnesses, characterized by a pendulum attenuation (in analogy to DIN 53157, see below) ≧80 sec., and high flexibilities, characterized by Erichsen indentations ≧5 mm (see below), without the systems receiving low grades for viscosity and reactivity. Moreover, the coatings obtainable from the formulations of the invention feature enhanced weathering resistance as can be determined, for examples, by sun tests.

The examples below are intended to illustrate the present invention without, however, limiting it.

EXAMPLES

I Preparing the Formulation of the Invention

1. Examples 1 to 10

A stirred vessel was charged with 1000 parts[1]) of the cyanurate of hexamethylene diisocyanate, 1.44 parts of 2,6-di-tert-butyl-4-methylphenol and 0.72 part of hydroquinone monomethyl ether. This initial charge was heated to 50° C., 0.3 part of dibutyltin dilaurate was added, and then, at a temperature of 50 to 60° C., x parts of hydroxyethyl acrylate (HEA, see Table 1) were added dropwise. The mixture was subsequently heated to 70° C. and this temperature was maintained for 3 hours. Then, while still retaining the temperature, y parts of methanol (MeOH, see Table 1) were added and the temperature was maintained for 2 hours more until the NCO value had fallen to 0.05%. The mixture was then cooled and the colorless product was discharged at 60° C.

1) All amounts (parts) hereinbelow are to be understood as parts by weight.

Subsequently, the resulting urethane acrylates were blended in the amounts indicated in Table 1 with trimethylolpropane monoformal acrylate (TMPMFA), with or without 1,6-hexanediol diacrylate and 4% by weight of photoinitiator (2-hydroxy-2-methyl-1phenylpropan-1-one=DAROCURE® 1173 from Ciba-Spezialitätenchemie), based on the overall weight of components A to C. Table I indicates the viscosities and reactivities found for the formulations of Examples 1 to 10.

TABLE 1

| | Urethane prepolymer | | | HDDA[5]) | TMPMFA | Viscosity[3]) | Reactivity[4]) |
|---|---|---|---|---|---|---|---|
| Ex. | x HEA[1] | y MeOH[1] | [% by wt.][2] | [% by wt.][2] | [% by wt.][2] | [Pas] | m/min |
| 1 | 362 | 76.3 | 70 | 0 | 30 | 9.9 | 20 |
| 2 | 453 | 50.8 | 62.5 | 0 | 37.5 | 6.0 | 20 |
| 3 | 453 | 50.8 | 60 | 5 | 35 | 2.6 | 20 |
| 4 | 453 | 50.8 | 60 | 6 | 34 | 2.5 | 20 |
| 5 | 453 | 50.8 | 60 | 0 | 40 | 3.1 | 20 |
| 6 | 513 | 33.9 | 61.4 | 0 | 38.6 | 3.8 | 20 |
| 7 | 513 | 33.9 | 60 | 5 | 35 | 4.0 | 20 |
| 8 | 513 | 33.9 | 60 | 6 | 34 | 4.0 | 25 |
| 9 | 513 | 33.9 | 60 | 0 | 40 | 6.0 | 25 |
| 10 | 453 | 50.8 | 40 | 20 | 40 | 0.33 | 20 |

[1])parts by weight of hydroxyethyl acrylate (HEA) and methanol per 1000 parts by weight of the cyanurate of hexamethylene diiocyanate
[2])% by weight of components A to C in the radiation-curable formulation
[3])determined at 23° C. using an ICI cone-plate viscometer
[4])determined on coatings with a wet film thickness of 100 μm on glass in the manner described above
[5])1,6-hexanediol diacrylat Examples 11 to 14, Comparative Examples V1, V2

Following the procedure of Examples 1 to 10, a urethane acrylate was prepared from 1000 parts by weight of the isocyanurate of hexamethylene diisocyanate, 453 parts of hydroxyethyl acrylate and 50.8 parts of methanol. 70 parts of the urethane acrylate thus prepared were then blended with 30 parts of the monoacrylate indicated in Table 2 (component B) and 4 parts of the photoinitiator Darocure® 1173.

The viscosity and reactivity of the resulting formulations are indicated in Table 2.

TABLE 2

Examples 11 to 15, Comparative Examples V1, V2

| Example | Component B | Viscosity [Pas] | Reactivity [m/min] |
|---|---|---|---|
| 11 | Glycerol monoformal acrylate | 4.6 | 15 |
| 12 | Tetrahydrofurfuryl acrylate | 1.8 | 15 |
| 13 | Tetrahydropyran-4-yl acrylate | 3.6 | 15 |
| 14 | Cyclohexylmethyl acrylate | 2.8 | 15 |
| 15 | Tetrahydropyranyl-2-methyl acrylate | 3.6 | 15 |
| V1 | Tripropylene glycol monomethyl ether acrylate | 3.6 | 20 |
| V2 | Dipropylene glycol monomethyl ether acrylate | 2.4 | 30 |

II. Determining the Mechanical Properties of the Cured Coatings of Examples 1 to 14 and Comparative Examples V1 and V2

1. Coating Hardness

The coating hardness was characterized by determining the pendulum attenuation in analogy to DIN 53157. To this end the radiation-curable compositions of the Examples and Comparative Examples were applied with a wet film thickness of 100 μm to glass. The resulting sample was cured by being passed at a belt speed of 10 m/min and at a distance of 10 cm twice in front of a high-pressure mercury vapor lamp (120 W/cm). The pendulum attenuation was then determined using a pendulum device in accordance with DIN 53157 (König). The results are stated in seconds and are summarized in Table 3.

2. Flexibility

The flexibility of the coating was determined by measuring the Erichsen indentation in analogy to DIN 53156. To this end, the respective formulation was applied using a spiral-wound coating bar in a wet film thickness of 50 μm to a BONDER 132 metal panel. Curing was carried out in the manner described above by exposure with a high-pressure mercury vapor lamp (120 W/cm). The Erichsen indentation was then measured by pressing a metal ball into the uncoated side of the panel (DIN 53156). The results are summarized in Table 3.

TABLE 3

| Example | Pendulum attenuation [sec] | Erichsen indentation [mm] |
|---|---|---|
| 1 | 80 | 7.0 |
| 2 | 98 | 6.5 |
| 3 | 86 | 6.8 |
| 4 | 89 | 6.6 |
| 5 | 88 | 6.9 |
| 6 | 85 | 5.7 |
| 7 | 102 | 5.3 |
| 8 | 122 | 5.7 |
| 9 | 130 | 5.5 |
| 10 | 105 | 5.5 |
| 11 | 120 | 6.3 |
| 12 | 90 | 6.6 |
| 13 | 130 | 5.8 |
| 14 | 110 | 6.0 |
| 15 | 80 | 6.3 |
| V1 | 21 | 7.0 |
| V2 | 25 | 7.0 |

III. Determining the Weathering Stability of the Coatings of the Invention

The test systems used were formulations of 70 parts by weight of urethane acrylate from Example 2, 30 parts of reactive diluent as per Table 4 and the photoinitiator Darocure® 173 (Example 16, Comparative Example V3 and V4). The formulations were then applied to a glass plate with a wet film thickness of 100 μm using a box-type coating bar, the films were cured by UV radiation in the manner described for the pendulum test, and then the coatings were irradiated in a Heraeus Sun Test apparatus CPS+with an output of 750 W/m$^2$ at 37° C. After various periods the yellowing—as b values of the L*a*b system (determined using a Minolta Remission Colorimeter), and the degree of gloss, in accordance with DIN 67530 at 60° geometry, were recorded. The b values are summarized in Table 4 for different times. The gloss values of all formulations were within the range from 170 to 178 and remain at approximately the same level throughout the 1000-hour exposure time.

TABLE 4

| Example | Reactive Diluent | b values | | | |
|---|---|---|---|---|---|
| | | 0 h | 160 h | 700 h | 1000 h |
| V3 | HDDA[1] | 0.45 | 0.7 | 0.7 | 0.82 |
| 16 | TMPMFA[2] | 0.29 | 0.47 | 0.5 | 0.55 |
| V4 | LR8945[3] | 0.3 | 1.79 | 3.0 | 3.6 |

[1]1,6-hexanediol diacrylate
[2]trimethylolpropane monoformal acrylate
[3]LAROMER ® LR8945 from BASF; polyether acrylate modified with bisphenol A units The increase in the b values corresponds to increasing yellowing. The increase in yellowing is least pronounced for the formulation of Example 16 according to the invention.

In addition, the thermal stability of the formulations of Example 16 and of the Comparative Examples V3 and V4 were determined by measuring the b value after thermal conditioning at 100° C. for 24 hours. In parallel with this a formulation was examined in which the HDDA from Example V3 had been replaced by N-vinylcaprolactam (Comparative Example V5). For Example 15 and Comparative Examples V3 and V4, no notable increase in the b value was observed. In contrast, the b value for the sample from V5 shows a dramatic increase, corresponding to marked yellowing under thermal exposure.

We claim:

1. A radiation-curable formulation consisting of the components,

A: at least one aliphatic, urethane-functional prepolymer which on average has at least two ethylenically unsaturated double bonds per molecule, B: at least one monofunctional ester of an α,β-ethylenically unsaturated carboxylic acid with a monofunctional alcohol which has at least one saturated 5- or 6-membered carbocycle or one saturated 5- or 6-membered heterocycle with one or two oxygens in the ring, optionally C: di- or polyfunctional esters of an α,β-ethylenically unsaturated carboxylic acid with an aliphatic di- or polyol, and up to 20% by weight, based on the overall weight of components A, B and C, of one or more auxiliaries selected from the group consisting of catalysts, polymerization inhibitors, defoamers, LTV stabilizers, free radical scavengers, inert solvents, lubricants, pigments, fillers selected from the group consisting of silicates, silica, talc, aluminum silicates and calcium carbonate, and photoinitiators.

2. A formulation as claimed in claim 1, containing from 20 to 90% by weight of component A, from 10 to 80% by weight of component B, from 0 to 40% by weight of component C and up to 20% by weight, based on the overall weight of components A, B and C, of said auxiliaries, with the proviso that the amounts of weight of components A, B and C in the mixture of A, B and C add up to 100% by weight.

3. A formulation as claimed in claim 2, in which the weight ratio of component B to component C is in the range from 20:1 to 1:1.

4. A formulation as claimed in claim 2, in which component B is a compound of the formula (I)

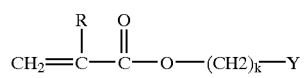

where

R is H or $CH_3$, k is from 0 to 4, and

Y is a 5- or 6-membered saturated carbocycle or a 5- or 6-membered saturated heterocycle with one or two oxygens, the heterocycle being unsubstituted or substituted by $C_1$–$C_4$-alkyl.

5. A formulation as claimed in claim 4, in which component B is selected from the group consisting of trimethylolpropane monoformal acrylate, glycerol monoformal acrylate, cyclohexylmethyl acrylate, 4-tetrahydropyranyl acrylate, 2-tetrahydropyranylmethyl acrylate and tetrahydrofurfuryl acrylate.

6. A formulation as claimed in claim 2, in which component C is selected from the group consisting of diacrylates and dimethacrylates of aliphatic diols.

7. A formulation as claimed in claim 6, wherein component C comprises 1,6-hexanediol diacrylate and/or 1,4-butanediol diacrylate.

8. A formulation as claimed in claim 2, in which the ethylenically unsaturated double bonds of the aliphatic, urethane-functional prepolymer are in acrylate and/or methacrylate groups.

9. A formulation as claimed in claim 2, in which the aliphatic, urethane-functional prepolymer is obtained by reacting the components:

(a1): at least one aliphatic compound or one aliphatic prepolymer having at least two isocyanate groups, (a2): at least one compound which has at least one reactive OH group and at least one ethylenically unsaturated double bond and, if desired, (a3) one or more aliphatic compounds having at least one reactive OH group.

10. A formulation as claimed in claim 9, where component (a1) is selected from the group consisting of biurets and the isocyanurates of aliphatic diisocyanates and from the adducts of aliphatic diisocyanates with polyfunctional, aliphatic alcohols having at least 3 reactive OH groups.

11. A formulation as claimed in claim 10, where component (a1) is the isocyanurate of hexamethylene diisocyanate.

12. A formulation as claimed in claim 9, where component (a2) is at least one ester of acrylic acid and/or methacrylic acid with at least one aliphatic di- or polyol, where the ester still has at least one free OH group.

13. A formulation as claimed in claim 12, wherein component (a2) is selected from the group consisting of 2-hydroxyethyl (meth)acrylate, hydroxypropyl (meth) acrylate, 1,4-butanediol mono(meth)acrylate, trimethylolpropane mono- and di(meth)acrylate and pentaerythritol tri(meth)acrylate.

14. A formulation as claimed in claim 13, where component (a1) is the isocyanurate of hexamethylene diisocyanate and where the ratio of the OH groups of components (a2) and (a3) to the NCO groups of component (a1) is $\geq 1$.

15. A formulation as claimed in claim 14, where component (a3) is a monofunctional alkanol having 1 to 10 carbons and is present in the formulation.

16. A formulation as claimed in claim 9, where component (a3) is a monofunctional alkanol having 1 to 10 carbons.

17. A formulation as claimed in claim 9, where the ratio of the OH groups of components (a2) and (a3) to the NCO groups of component (a1) is $\geq 1$.

18. A formulation according to claim 9, wherein component (a1) is the isocyanurate of hexamethylene diisocyanate, component (a2) is hydroxyethyl acrylate, component (a3) is methanol, and component B is trimethylolpropane monoformal acrylate.

19. A formulation according to claim 18 further containing, as component C, 1,6-hexanedioldiacrylate.

20. A formulation according to claim 9, wherein component (a1) is the isocyanurate of hexamethylene diisocyanate, component (a2) is hydroxyethyl acrylate, component (a3) is methanol, and component B is glycerol monoformal acrylate.

21. A method of coating substrates, which comprises applying a formulation as claimed in claim 2, to the substrate which is to be coated, removing any solvent and then curing the coating by radiation with UV radiation or electron beams.

22. The method as claimed in claim 21, where the substrate is a metal or a coated metal.

23. A coated substrate obtained by a method as claimed in claim 21.

24. A radiation-curable formulation comprising the components,

A: at least one aliphatic, urethane-functional prepolymer which on average has at least two ethylenically unsaturated double bonds per molecule, B: at least one monofunctional ester of an α,β-ethylenically unsaturated carboxylic acid with a monofinctional alcohol selected from the group consisting of trimethylolpropane monoformal acrylate, glycerol monoformal acrylate, cyclohexylmethyl acrylate, 4-tetrahydropyranyl acrylate, and 2-tetrahydropyranylmethyl acrylate, optionally C: di- or polyfinctional esters of an α,β-ethylenically unsaturated carboxylic acid with an aliphatic di- or polyol.

25. A formulation as claimed in claim 24, containing from 20 to 90% by weight of component A, from 10 to 80% by weight of component B, from 0 to 40% by weight of component C and up to 20% by weight, based on the overall weight of components A, B and C, of auxiliaries, with the proviso that the amounts of weight of components A, B and C in the mixture of A, B and C add up to 100% by weight.

26. A formulation as claimed in claim 25, in which the weight ratio of component B to component C is in the range from 20:1 to 1:1.

27. A formulation as claimed in claim 25, in which component C is selected from the group consisting of diacrylates and dimethacrylates of aliphatic diols.

28. A formulation as claimed in claim 27, wherein component C comprises 1,6-hexanediol diacrylate and/or 1,4-butanediol diacrylate.

29. A formulation as claimed in claim 25, in which the ethylenically unsaturated double bonds of the aliphatic, urethane-functional prepolymer are in acrylate and/or methacrylate groups.

30. A formulation as claimed in claim 25, in which the aliphatic, urethane-functional prepolymer is obtained by reacting the components:
- (a1): at least one aliphatic compound or one aliphatic prepolymer having at least two isocyanate groups,
- (a2): at least one compound which has at least one reactive OH group and at least one ethylenically unsaturated double bond and, if desired,
- (a3) one or more aliphatic compounds having at least one reactive OH group.

31. A formulation as claimed in claim 30, where component (a1) is selected from the group consisting of biurets and the isocyanurates of aliphatic diisocyanates and from the adducts of aliphatic diisocyanates with polyfunctional, aliphatic alcohols having at least 3 reactive OH groups.

32. A formulation as claimed in claim 31, where component (a1) is the isocyanurate of hexamethylene diisocyanate.

33. A formulation as claimed in claim 30, where component (a2) is at least one ester of acrylic acid and/or methacrylic acid with at least one aliphatic di- or polyol, where the ester still has at least one free OH group.

34. A formulation as claimed in claim 33, wherein component (a2) is selected from the group consisting of 2-hydroxyethyl (meth)acrylate, hydroxypropyl (meth)acrylate, 1,4-butanediol mono(meth)acrylate, trimethylolpropane mono- and di(meth)acrylate and pentaerythritol tri(meth)acrylate.

35. A formulation as claimed in claim 34, where component (a1) is the isocyanurate of hexamethylene diisocyanate and where the ratio of the OH groups of components (a2) and (a3) to the NCO groups of component (a1) is $\geq 1$.

36. A formulation as claimed in claim 35, where component (a3) is a monofunctional alkanol having 1 to 10 carbons and is present in the formulation.

37. A formulation as claimed in claim 30, where component (a3) is a monofunctional alkanol having 1 to 10 carbons.

38. A formulation as claimed in claim 30, where the ratio of the OH groups of components (a2) and (a3) to the NCO groups of component (a1) is $\geq 1$.

39. A formulation according to claim 30, wherein component (a1) is the isocyanurate of hexamethylene diisocyanate, component (a2) is hydroxyethyl acrylate, component (a3) is methanol, and component B is trimethylolpropane monoformal acrylate.

40. A formulation according to claim 39 further containing, as component C, 1,6-hexanedioldiacrylate.

41. A formulation according to claim 30, wherein component (a1) is the isocyanurate of hexamethylene diisocyanate, component (a2) is hydroxyethyl acrylate, component (a3) is methanol, and component B is glycerol monoformal acrylate.

42. A method of coating substrates, which comprises applying a formulation as claimed in claim 25, to the substrate which is to be coated, removing any solvent and then curing the coating by radiation with UV radiation or electron beams.

43. The method as claimed in claim 42, where the substrate is a metal or a coated metal.

44. A coated substrate obtained by a method as claimed in claim 42.

* * * * *